March 14, 1950     J. R. BOWMAN     2,500,240
APPARATUS FOR THE SEPARATION OF GASEOUS MIXTURES
Filed May 1, 1945
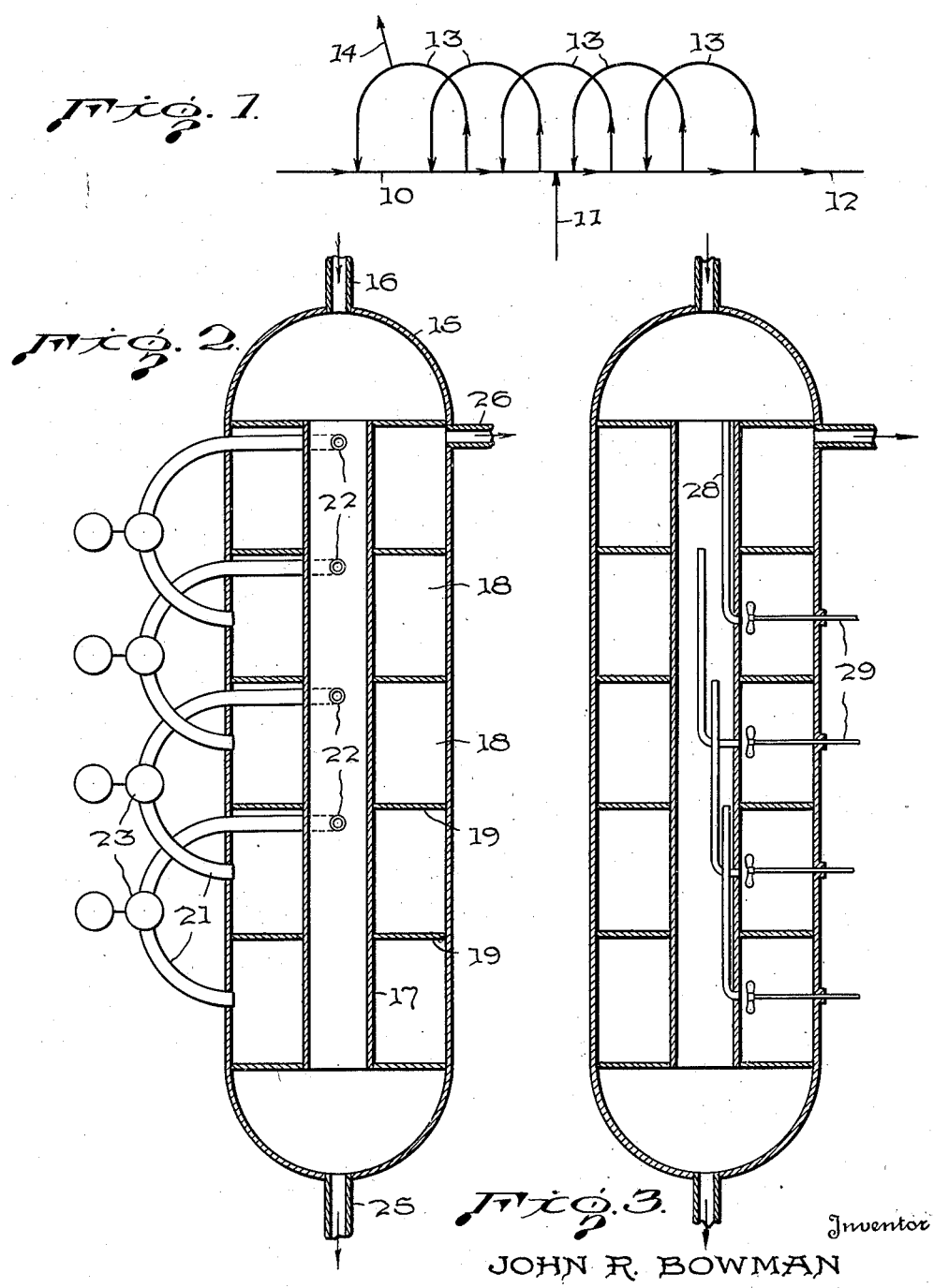
Inventor
JOHN R. BOWMAN Patented Mar. 14, 1950

2,500,240

UNITED STATES PATENT OFFICE 2,500,240

APPARATUS FOR THE SEPARATION OF GASEOUS MIXTURES

John R. Bowman, Pittsburgh, Pa., assignor to Gulf Research & Development Company, a corporation of Delaware Application May 1, 1945, Serial No. 591,381

1 Claim. (Cl. 183—2)

This invention relates to apparatus for the separating of materials, and more particularly to an apparatus for the separation of homogeneous single phase mixtures.

The separation of homogeneous single phase mixtures has been accomplished in various ways dependent upon the particular mixtures to be separated. These methods include distillation, diffusion, extraction, absorption, adsorption, fractional recrystallization, etc.

These separatory processes are all susceptible of improvement, primarily in overall economy or in ability to separate two or more materials whose physical properties make them difficult to separate. In the case of diffusion, particularly of gases, for example, methods have not been evolved which are capable of extensive commercial use, primarily because the gas passing through the diffusion membrane is not substantially pure and thus efficient separation has not been attained.

In the case of distillation, it has been a more recent practice to use methods in which there is rectification or intermediate enrichment of the vapor, usually effected in a rectifying column, such as a bubble plate rectifier, packed tower, or Steadman still. These methods, however, fail under certain operating conditions, such as under high vacuum, and the need has been recognized for a rectifying method operable at high vacuum in an efficient manner.

In general, the prior methods of separation of homogeneous single phase mixtures have depended upon countercurrent contacting.

In accordance with the present invention, I have provided an apparatus for the separation of homogeneous single phase mixtures not using countercurrent contacting, the operation of said apparatus comprising establishing a main stream of the mixture, removing a plurality of side streams from the main stream having different compositions from the main stream at their respective points of origin and returning these side streams out of contact with the main stream to the main stream at points where the compositions of the two are substantially equal.

By way of illustration of a specific utilization of my apparatus, two gases such as hydrogen and methane in admixture may be passed longitudinally through a tube of permeable material about which are separated segmented chambers. The gas which diffuses into each chamber is richer in hydrogen than the gas in the stream just outside the chamber. This gas is removed from the chamber and reintroduced to the main stream at a point upstream from its origin where the hydrogen and methane ratio is about the same as the gas removed from the chamber. Repeated operation in a plurality of chambers causes an enrichment of the gases downstream, so that almost pure methane can be obtained from the downstream end of the tube and at the same time a gas quite rich in hydrogen is obtained in the most upstream chamber. The apparatus for applying this method will be described below in detail.

In the accompanying drawings:

Figure 1 is a diagrammatic showing of the invention broadly;

Figure 2 is a view in section of a diffusion apparatus;

Figure 3 is a view in section of an alternative diffusion apparatus.

In Figure 1 there is shown diagrammatically the general concept of the invention. Line 10 represents a main stream of a single phase homogeneous mixture flowing as indicated by the arrows. Line 11 indicates the feed line and line 12 indicates the end of the main stream where the product is substantially freed from one or more of its components. Curved lines 13 indicate that a part of the main stream is taken off with change in composition at the point of origin and returned to the main stream at a point upstream. In the flow diagram it is not possible to show that at the point at which material is taken off from the main stream, there should be a device for changing the composition of the mixture, so that the material in the side stream is of a different composition from the material in the main stream at the point where the side stream emerges. This device may be a diffusion membrane or a heated plate, as will be illustrated below, or other device for accomplishing a separation as described. One of the components is taken off at point 14 and the other component is taken off at the end 12 of the main stream. Feed may be introduced at the entrance end of the main stream instead of at line 11.

With reference to Figure 2, there is illustrated an apparatus for carrying out the invention as specifically applied to diffusion. The device illustrated is adapted to the removal, for example, of hydrogen from a methane-hydrogen mixture. A cylinder 15, preferably of heavy steel, contains a conduit 16 at its upper end and concentrically arranged therein is a cylindrical tube 17 of permeable material, such as porous clay. The space between tube 17 and the outer walls of cylinder 15 is divided into compartments or cells 18 by means of perforate circular bulkheads 19 which may be of relatively thin steel. From each cell 18 there extends a conduit 21 which extends upstream for a predetermined distance and terminates as an opening 22 inside the permeable tube 17. The conduits 21 are equipped with pumps 23 to cause the flow of gas from the cells 18 to the permeable tube 17.

In the operation of this device, the gas mixture enters the cylinder 15 by means of conduit 16 and passes down the permeable tube 17 and out of the conduit 25. In so doing, a part of the mixture richer in hydrogen than the main stream at the respective points of origin diffuses through the walls of porous cylinder 17 and enters each of the cells 18. This diffused gas is returned to points upstream from the cell in which it was extracted. These points may be calculated or determined by test and for best separation, should be the point at which the concentrations of hydrogen in the conduits 21 and in the main stream at points 22 are respectively substantially equal. The gas, rich in hydrogen, which is collected in the uppermost cell passes out of conduit 26 and is collected for use where gases rich in hydrogen are desirable or may be in part reintroduced with the original mixture. It will be seen that as the main stream moves downward it loses more and more of its hydrogen, until a gas comprising substantially pure methane is removed at conduit 25. By this method it is possible to obtain a product containing about 99 per cent methane and 1 per cent hydrogen from the conduit 25 and a product containing about 20 per cent methane and 80 per cent hydrogen from the conduit 26, starting with a feed containing 50 per cent hydrogen.

In Figure 3 there is shown an alternative device to Figure 2, in which conduits 28 similar in function to conduit 21 of Figure 2 are placed inside of the outer steel cylinder 15 and extend entirely within porous tube 17. In this manner there is no high pressure differential in these conduits and pumps 29 may be easily installed in the side walls of cylinder 15.

Alternatively steam may be used as a scavenging gas to sweep the absorbed gas out of the cells and there may be devices to remove the steam before the gas is reintroduced into the main stream. In this case it will be understood that the steam is not to be considered as changing the constitution of the stream but rather that it acts as a physical means of conveying the gas.

The invention has been described as directed to the separation of single phase homogeneous materials but it will be understood that the separation is only partial or an enrichment. The separation of two components from each other by this method may result in two products, one enriched greatly in the first component and the other enriched slightly in the second component or both products may be greatly enriched, one in the first component and the other in the second component, depending upon the point at which the feed enters. As described with reference to Figure 1 the feed may be at the beginning of the main stream or at an intermediate point. This applies to each of the devices illustrated.

Thus, I have described an apparatus for the separation of single phase homogeneous mixtures wherein a main stream of the mixture is established and a plurality of side streams removed having different compositions from the main stream at the respective points of origin and wherein the side streams are returned to the main stream at points where the composition of the main stream and the side streams are substantially equal.

What I claim is:

Apparatus for separation of gaseous mixtures comprising an elongated shell having an inlet and an outlet at its ends, end partitions within the shell defining chambers adjacent to the inlet and outlet, a conduit of permeable material extending between the end partitions and opening into said chambers, a series of additional partitions extending from the wall of the shell and surrounding said conduit thereby forming separate cells each having a permeable wall formed by a portion of the said conduit, means for introducing a gaseous mixture at the inlet of the shell whereby as it flows through the permeable conduit toward the outlet diffusion occurs into the several cells, the diffusate being richer in the gaseous component of greatest diffusibility, pipes extending from the respective cells to upstream points in the permeable conduit at which the composition of the diffusate so introduced is substantially the same as that of the main stream at the point of their mixing, means for establishing flow of diffusate from said cells through said pipes, the said outlet from said shell providing means for withdrawal of the least diffusible component of the gaseous mixture, and a second outlet communicating with a cell remote from the first said outlet for removing the gaseous component of greater diffusibility.

JOHN R. BOWMAN.

REFERENCES CITED

The following references are of record in the file of this patent:

UNITED STATES PATENTS

| Number | Name | Date |
|---|---|---|
| 1,496,757 | Lewis et al. | June 3, 1924 |
| 1,700,928 | Fawkes | Feb. 5, 1929 |
| 2,147,222 | Treub | Feb. 14, 1939 |
| 2,266,053 | Litton | Dec. 16, 1941 |
| 2,313,175 | Scott | Mar. 9, 1943 |
| 2,422,882 | Bramley | June 24, 1947 |

FOREIGN PATENTS

| Number | Country | Date |
|---|---|---|
| 266,396 | Great Britain | Feb. 23, 1927 |
| 258,336 | Italy | Apr. 16, 1928 |

OTHER REFERENCES

"Separation Processes," Randell et al.: Id. Eng. Chem., Jan. 1940, vol. 32, No. 1, pp. 125–129.